(12) United States Patent
Grebennikov et al.

(10) Patent No.: US 11,698,828 B2
(45) Date of Patent: Jul. 11, 2023

(54) SYSTEMS AND METHODS FOR CROSS-REFERENCING FORENSIC SNAPSHOT OVER TIME FOR ROOT-CAUSE ANALYSIS

(71) Applicant: Acronis International GmbH, Schaffhausen (CH)

(72) Inventors: Nikolay Grebennikov, Sofia (BG); Candid Wüest, Basserdorf (CH); Serguei Beloussov, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 0 days.

(21) Appl. No.: 17/396,905

(22) Filed: Aug. 9, 2021

(65) Prior Publication Data
US 2022/0197731 A1 Jun. 23, 2022

Related U.S. Application Data

(60) Provisional application No. 63/130,065, filed on Dec. 23, 2020.

(51) Int. Cl.
*G06F 11/00* (2006.01)
*G06F 11/07* (2006.01)
*G06F 11/14* (2006.01)

(52) U.S. Cl.
CPC ........ *G06F 11/079* (2013.01); *G06F 11/0754* (2013.01); *G06F 11/0781* (2013.01);
(Continued)

(58) Field of Classification Search
CPC ............... G06F 11/079; G06F 11/0754; G06F 11/1451; G06F 11/0781; G06F 16/26;
(Continued)

(56) References Cited

U.S. PATENT DOCUMENTS

2011/0083098 A1 4/2011 Cisler et al.
2015/0106338 A1* 4/2015 Brandwine ......... G06F 11/1451
707/649

(Continued)

OTHER PUBLICATIONS

Adelstein, Frank et al., Snapshot Filtering Based on Resource-Usage Profiles, 2009, IEEE (Year: 2009).*

*Primary Examiner* — Marc Duncan
(74) *Attorney, Agent, or Firm* — ArentFox Schiff LLP; Michael Fainberg

(57) ABSTRACT

Aspects of the disclosure describe methods and systems for cross-referencing forensic snapshots over time. In one exemplary aspect, a method may comprise receiving a first snapshot of a computing device at a first time and a second snapshot of the computing device at a second time and applying a pre-defined filter to the first snapshot and the second snapshot, wherein the pre-defined filter includes a list of files that are to be extracted from each snapshot. The method may comprise subsequent to applying the pre-defined filter, identifying differences in the list of files extracted from the first snapshot and the second snapshot. The method may comprise creating a change map for the computing device that comprises the differences in the list of files over a period of time, wherein the period of time comprises the first time and the second time, and outputting the change map in a user interface.

19 Claims, 5 Drawing Sheets

(52) U.S. Cl.
CPC ...... *G06F 11/1451* (2013.01); *G06F 11/1453* (2013.01); *G06F 11/1469* (2013.01); *G06F 2201/84* (2013.01)

(58) Field of Classification Search
CPC .... G06F 16/447; G06F 16/248; G06F 21/562; G06F 2201/84; G06F 21/565
See application file for complete search history.

(56) References Cited

U.S. PATENT DOCUMENTS

| | | | |
|---|---|---|---|
| 2015/0178167 A1 | 6/2015 | Kulkarni et al. | |
| 2017/0180394 A1* | 6/2017 | Crofton | G06F 21/64 |
| 2018/0203996 A1* | 7/2018 | Gathala | G06F 21/554 |
| 2020/0004644 A1* | 1/2020 | Reed | G06F 16/2322 |
| 2020/0218614 A1* | 7/2020 | Adduri | G06F 16/128 |
| 2021/0336968 A1* | 10/2021 | Bender | H04L 63/145 |

* cited by examiner

SYSTEMS AND METHODS FOR CROSS-REFERENCING FORENSIC SNAPSHOT OVER TIME FOR ROOT-CAUSE ANALYSIS

CROSS-REFERENCE TO RELATED APPLICATIONS

This application claims the benefit of U.S. Provisional Application No. 63/130,065, filed Dec. 23, 2020, which is herein incorporated by reference.

FIELD OF TECHNOLOGY

The present disclosure relates to the field of data security, and, more specifically, to systems and methods for cross-referencing forensic snapshots over time.

BACKGROUND

As the reliance on digital computing has increased, the amount of cybercrimes such as hacking, data theft, and malware attacks, has followed suit. As a result, it has become necessary to save additional information about the data on a system when creating backup copies, which can be used to investigate these cybercrimes. Forensics engineers can utilize this additional information to determine the origins of an attack and detect remaining artifacts and traces of the attack on a system.

Forensic investigations typically do not, however, have access to file and memory content from previous points in time before a cybercrime occurs. This limits an efficient analysis because one cannot see a history of system configuration, exclusions in anti-virus software, provisioning errors by technician, etc. Furthermore, security information and event management (SIEM) and endpoint detection and response (EDR) solutions can only provide high level indications and logs of what happened, but miss the content of crucial files such as configuration files. Not to mention, using traditional backup restore points to restore and compare files is a time consuming process and needs large disk space.

There is thus a need to present investigators with critical information associated with a cybercrime in an efficient manner.

SUMMARY

To address these shortcomings, aspects of the disclosure describe methods and systems for cross-referencing forensic snapshots over time. In one exemplary aspect, a method may comprise receiving a first snapshot of a computing device at a first time and a second snapshot of the computing device at a second time. The method may comprise applying a pre-defined filter to the first snapshot and the second snapshot, wherein the pre-defined filter includes a list of files that are to be extracted from each snapshot. The method may comprise subsequent to applying the pre-defined filter, identifying differences in the list of files extracted from the first snapshot and the second snapshot. The method may comprise creating a change map for the computing device that comprises the differences in the list of files over a period of time, wherein the period of time comprises the first time and the second time, and outputting the change map in a user interface.

In some aspects, the method may comprise receiving a third snapshot of the computing device at a third time, applying the pre-defined filter to the third snapshot, identifying differences in the list of files extracted from the second snapshot and the third snapshot, and modifying the change map for the computing device to further include differences in the list of files at the third time, wherein the period of time further comprises the third time.

In some aspects, the differences in the list of files at the third time is relative to the second time.

In some aspects, the differences in the list of files at the third time is relative to the first time.

In some aspects, the change map is visually outputted in a user interface as a timeline with a plurality of selectable time points each representing a snapshot of the computing device. The method may comprise receiving a selection of a time point, and generating a window with respective differences between a filtered snapshot associated with the time point and a prior filtered snapshot.

In some aspects, the time point selected is the second time associated with the second snapshot, and the window presents the differences in the list of files extracted from the first snapshot and the second snapshot.

In some aspects, the window is interactive and presents drill-down analysis for each file in the respective differences.

In some aspects, the method may comprise outputting the change map in the user interface in response to detecting an error in the computing device.

In some aspects, outputting the change map further comprises transmitting an alert to a forensic investigation entity, wherein the alert comprises access to the change map.

In some aspects, the change map indicates changes made by the user and changes made by an unauthorized entity, and the method may comprise filtering the change map to not show the changes made by the user.

In some aspects, filtering the change map to not show the changes made by the user comprises classifying each change in the change map using a machine learning algorithm trained on a dataset that indicates a plurality of changes and an identifier of an entity that executed each of the plurality of changes.

In some aspects, the method may comprise retrieving, for the first snapshot and the second snapshot, metadata that indicates states of the computing device at the first time and the second time. The method may comprise determining a first performance score based on a state of the computing device at the first time and a second performance score based on a state of the computing device at the second time. The method may comprise determining a change differential between the first performance score and the second performance score, and marking a time point in the change map if the change differential is greater than a threshold change differential.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for cross-referencing forensic snapshots over time. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

In order to address the shortcomings described in the background, the present disclosure compares the backup and memory dump in multiple backup snapshots, in order to identify suspicious artifacts and system file changes (e.g. configuration files and processes that have changed over multiple snapshots). An exemplary system then creates a change map that is updated whenever a new backup is created. This change map serves as the backbone for a forensic time machine user interface (UI) that is provided to a forensics investigator. This UI allows the investigator to cross-reference forensic snapshots at various time points (e.g., to browse critical changes as defined by a user or machine learning algorithm) and allows for drill-down analysis.

Figure 1:
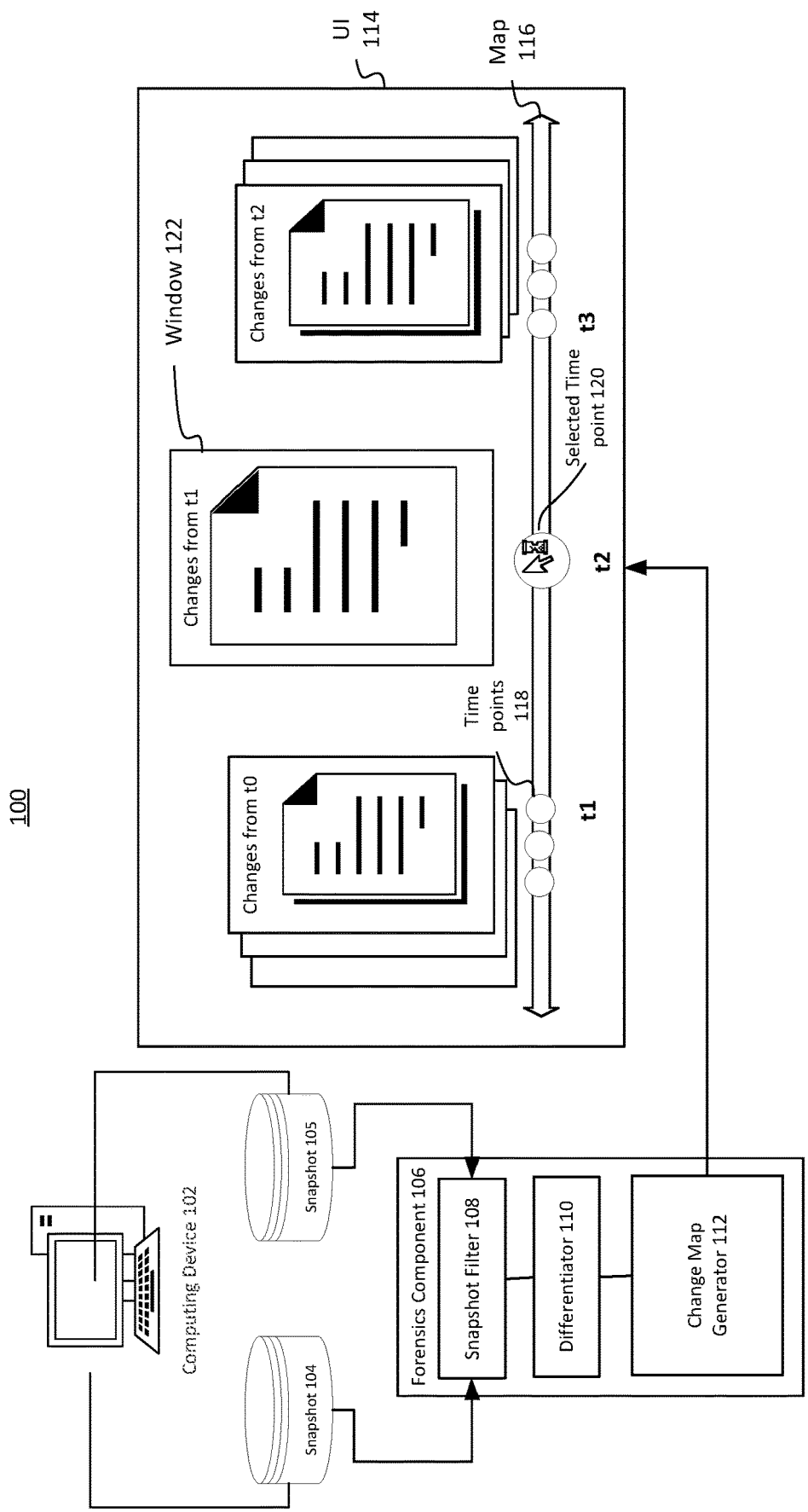
FIG. 1 is a block diagram illustrating a system for cross-referencing forensic snapshots over time.

FIG. 1 is a block diagram illustrating system 100 for cross-referencing forensic snapshots over time. In system 100, computing device 102 may be a computer, laptop, smartphone, server, or any other device capable of storing data that is backed up. Computing device 102 may periodically generate snapshots (i.e., data backups and/or memory dumps) such as snapshot 104. In some aspects, snapshot 104 is an image backup of computing device 102. In other aspects, snapshot 104 is a collection of files, processes, applications, etc., that are stored on computing device 102. Snapshot 104 may be stored on computing device 102, or may be transmitted to a remote server that computing device 102 is connected to.

In the present disclosure, forensics component 106 is configured to analyze the snapshots produced by computing device 102 and generate a change map that allows any forensics investigator, device administrator, and device user to cross-reference snapshots over a plurality of time points. This cross-referencing allows for an efficient, organized, and focused way for performing forensics analysis. Forensics component 106 may be stored on computing device 102, or may be split across computing device 102 and a remote server in a thin and thick client scheme. For example, computing device 102 may transmit snapshot 104 to the remote server where forensics component 106 is installed. Forensics component 106 on the remote server may create a change map across multiple received snapshots, and transmit the change map to a thin client of forensics component 106 on computing device 102. The thin client may then present the change map on computing device 102.

Forensics component 106 comprises snapshot filter 108, which identifies specific files in snapshots needed for comparison, differentiator 110, which is a module that compares filtered snapshots, and change map generator 112, which is a module that creates a change map with snapshot information at various time points that can be browsed. In some aspects, forensics component 106 may be a component of a security software (e.g., an anti-virus application) or a backup software. In other aspects, forensics component 106 may be a standalone application.

More specifically, forensics component 106 may receive a first snapshot (e.g., snapshot 104) of a computing device (e.g., computing device 102) at a first time (e.g., t1) and a second snapshot (e.g., snapshot 105) of the computing device at a second time (e.g., t2). Forensics component 106 may then apply a pre-defined filter (e.g., snapshot filter 108) to the first snapshot and the second snapshot. The pre-defined filter includes a list of files that are to be extracted from each snapshot. For example, the pre-defined filter may exclude cache files from being extracted.

Subsequent to applying the pre-defined filter, forensics component 106 identifies, using differentiator 110, differences in the list of files extracted from the first snapshot and the second snapshot. Forensics component 106 creates, using change map generator 112, a change map (e.g., map 116) for the computing device that comprises the differences in the list of files and processes over a period of time (wherein the period of time comprises the first time and the second time). Forensics component 106 may then output the change map in a user interface (e.g., UI 114).

In some aspects, as new snapshots are generated, forensics component 106 may dynamically update the change map. For example, forensics component 106 may receive a third snapshot of the computing device (e.g., computing device 102) at a third time (e.g., t3). Forensics component 106 may then apply the pre-defined filter (e.g., snapshot filter 108) to the third snapshot and identify differences in the list of files extracted from the second snapshot and the third snapshot. Based on the identified changes, forensics component 106 may modify the change map (e.g., 116) for the computing device to further include differences in the list of files at the third time (e.g., t3).

In terms of the appearance of the change map, the change map (e.g., map 116) is visually outputted in a user interface (e.g., UI 114) as a timeline with a plurality of selectable time points 118, each representing a snapshot of the computing device. Forensics component 106 may thus receive a selection of a time point (e.g., selected time point 120) and generate a window with respective differences between a filtered snapshot associated with the time point and a prior filtered snapshot. Referring to system 100, the selected time point may be time point t2, which is when the second snapshot was captured. As a result, window 122 presents the differences in the list of files extracted from the first snapshot and the second snapshot (i.e., how did computing device 102 change between time t1 and t2). In some aspects, window 122 is interactive and presents drill-down analysis for each file in the respective differences. For example, if window 122 indicates that file 1 changed between t1 and t2, a user may select an identifier of file 1 (e.g., an application icon) to receive information about what caused the change, at what time, access records, dependencies, etc. In some aspects, a state of file 1 may be presented via window 122. In some aspects, files may be pre-loaded into window 122. It should be noted that although files are primarily mentioned in this disclosure, processes are also considered when presenting snapshots.

In some aspects, forensics component 106 may output UI 114 on computing device 102 and/or an analysis device of a forensic investigation entity in response to detecting an error in computing device 102. For example, forensics component 106 may be installed on a remote server as a thick client that receives information from a thin client of forensics component 106. The thick client may monitor for periodic heartbeat messages from the thin client. In response to determining that a threshold period of time (e.g., one hour) has passed without a received message, forensics component 106 may determine that computing device 102 has crashed or has been compromised (e.g., by ransomware that encrypts data on computing devices). In some aspects, forensics component 106 may transmit an alert to a forensic investigation entity, wherein the alert comprises access to the change map. For example, forensics component 106 may send a link to the change map to the forensics investigation entity over the Internet (e.g., a URL). Clicking the link will provide access to UI 114.

Figure 2:
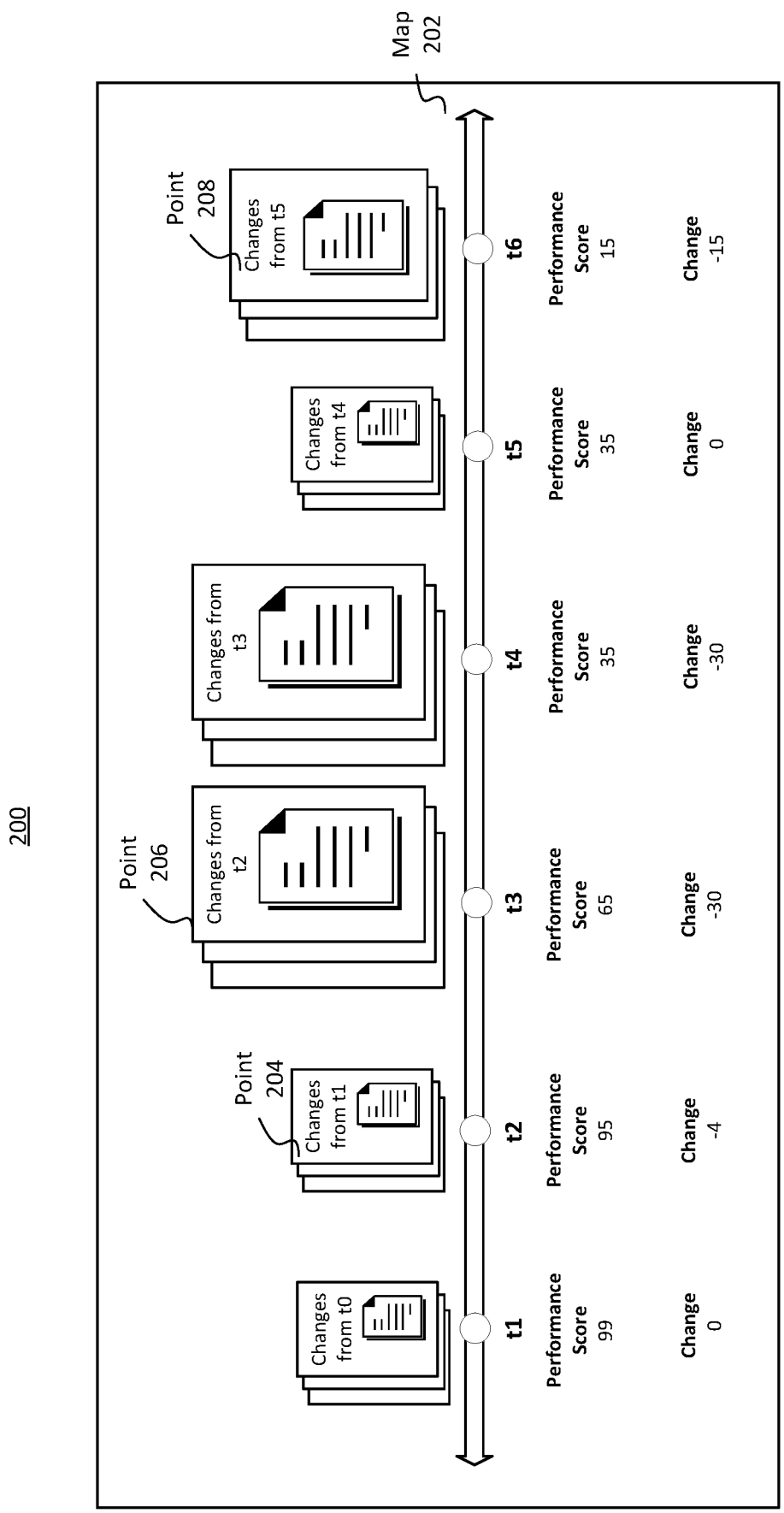
FIG. 2 is a block diagram illustrating a user interface that highlights time points of interest for a forensics analysis.

FIG. 2 is a block diagram illustrating user interface 200 that highlights time points of interest for a forensics analysis. An objective of the present disclosure is to streamline the data presented for a forensics investigator. In some cases, there may be several time points and associated backups to view in a given change map—overwhelming a user. Forensics component 106 may be configured to adjust user interface 200 in order to highlight time points of interest. Thus, any malicious software is immediately identified, analyzed, and addressed.

For example, in some aspects, forensics component 106 may adjust the change map such that it indicates changes made by the user and changes made by an unauthorized entity. In some aspects, forensics component 106 may filter the change map to not show the changes made by the user (i.e., manual changes). For example, forensics component 106 may classify each change in the change map using a machine learning algorithm trained on a dataset that indicates a plurality of changes and an identifier of an entity that executed each of the plurality of changes. The dataset may specifically capture changes that are performed by a known malicious entity (e.g., a virus) and classify them as malicious. Accordingly, if those changes are not detected, any remaining changes may likely be one performed by the user. For example, the machine learning algorithm may be a one-class support vector machine that is trained with a dataset that includes an instance where a certain file is encrypted in a certain directory by a malicious software. If that change is detected (i.e., matches an input change), forensics component 106 determines that the input change is made by the malicious software. However, if the input change is different, the input change is attributed to the user.

In other aspects, forensics component 106 may adjust user interface 200 based on changes in performance of computing device 102. For example, forensics component 106 may identify when the performance of computing device 102 degraded the most and adjust the visual appearance of the closest time points on change map 202. In FIG. 2, multiple time points and their associated changes are shown. At each time point, forensics component 106 determines a performance score of computing device 102. At time t1, the performance score is 99. At time t2, the performance score is 95. The change in performance is −4. The changes at the first two time points including point 204 are represented by icons of a first size. At time t3, the performance score drops to 65. The change between t2 and t3 is −30. Accordingly, the visual indicator of point 206 is larger to signify that the user (e.g., a forensics investigator) should focus on point 206. In some aspects, the size of a visual indicator is proportional to the performance score change. For example, the size of point 208's visual indicator is larger than point 206's visual indicator and smaller than point 204's visual indicator. In other aspects, there may be pre-set sizes of visual indicators and forensics component 106 may rely on a threshold to determine how to size the visual indicator. For example, a first threshold may be 25 and a second threshold may be 50 and forensics component 106 may compare the performance score change to each threshold. If the performance score change is greater than a first threshold, the size is set to a first size (e.g., 50 pixels by 50 pixels). If the performance score change is greater than a second threshold, the size is set to a second size (e.g., 100 pixels by 100 pixels).

For any two snapshots, forensics component 106 may retrieve, for the first snapshot and the second snapshot, metadata that indicates states of the computing device at the first time and the second time. Forensics component 106 may then determine a first performance score based on a state of the computing device at the first time and a second performance score based on a state of the computing device at the second time. Forensics component 106 may determine a change differential between the first performance score and the second performance score, and mark a time point (e.g., with a special indicator such as a star, or with a change in size of the visual indicator) in the change map if the change differential is greater than a threshold change differential.

As noted above, the performance may be quantified based on a state of the computing device, wherein the state includes a combination of attributes such as average CPU usage, average memory usage, battery life (e.g., if a computing device is portable), a number of crashes of applications within a period of time (e.g., between two or more snapshots), a number of crashes of the computing device within a period of time, a latency in accessing applications/files on the computing device compared to a normal access time, computing device hardware temperatures, etc. For example, if forensics component 106 is determining the performance based on average CPU usage (e.g., 86%) and a number of application crashes within the period of time (e.g., 4 crashes of 10 applications used in 24 hours), forensics component 106 may execute a linear combination of the values to determine a performance score. For simplicity, suppose that the linear combination places equal weights (1) on each attribute and is an average of the two values. In this case, 14% of the CPU is free and 6/10 applications have not crashed. The performance score will be (14+60)/2=37. In other aspects, a greater weight may be placed on one of the attributes. For example, the number of crashes may be set at a weight of 1.1. The performance score will thus be (14+1.1*60)/2=40.

In order to calculate the change differential in performance, forensics component 106 may determine a plurality of performance scores as described above over a period of time. Forensics component 106 may then determine a slope of the performance scores over the period of time. For example, if the performance score at t2 is 95 and then at t3 the performance score is 65, the change differential is −30. Suppose that the threshold change differential is 20. Because the magnitude of the change differential is 30, which is larger than the threshold, forensics component 106 may mark the visual indicator of point 206 (e.g., by making the size of the visual indicator larger relative to the other visual indicators).

Figure 3:
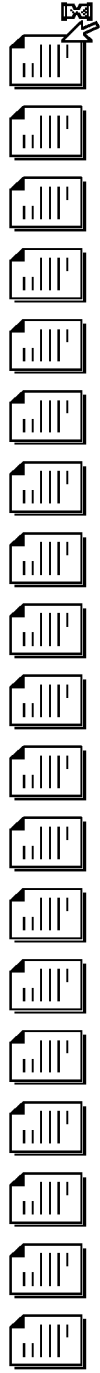
FIG. 3 is a block diagram illustrating a user interface in which a file is selected for drill-down analysis.
Figure 3:
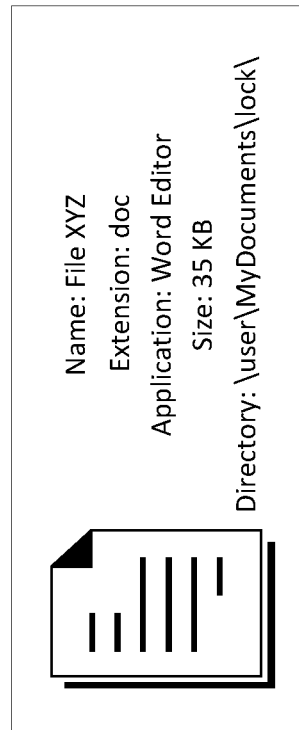
Figure 3:
Figure 3:
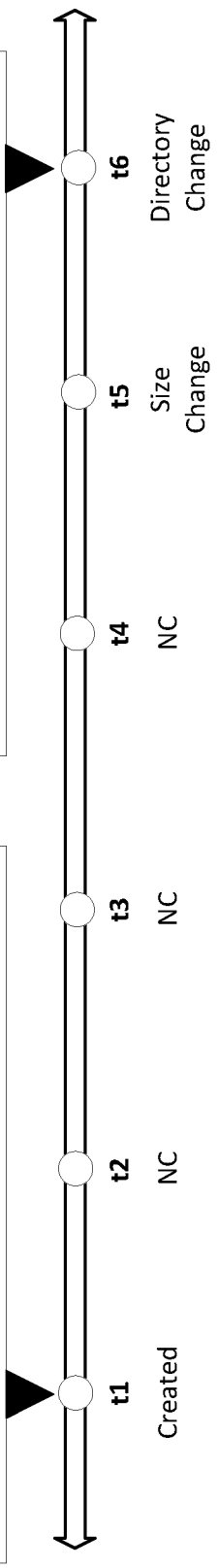

FIG. 3 is a block diagram illustrating user interface 300 in which a file is selected for drill-down analysis. Suppose that a user selects one of the visual indicators of a time point in user interface 300. The selection may launch a window in the user interface that lists all of the files that changed between the selected time point and a previous time point (e.g., a time point right before or a time point further in the past such as the first time point). For example, the user interface may be a table that lists files and describes the modifications (e.g., change in size, deletion, addition, change in location, etc.) performed on the file.

In some aspects, a user may select a specific file and perform a drill-down analysis. A drill-down analysis involves generating a file-specific change map. For example, on the user interface, a user may select a specific file and forensics component 106 may generate a change map listing all of the changes the file went through. In user interface 300, times t1-t6 are shown. Suppose that the user wanted to know more about File XYZ. When the user selects the file from the plurality of file icons, a file-specific change map is generated by forensics component 106. The change map indicates that at time t1, the file was created. A visual indicator with the file metadata (e.g., name, extension, application, size, etc.) is generated as well. At times t2, t3, t4, no change was made. Accordingly, the tag "NC" or "No Change" is listed. At time t5, the file was modified and the size of the file changed. In some aspects, the file-specific change map may further show the changes that caused the file size change (e.g., added text to the document). For example, a preview of the file may be generated showing the additional text as a redline. At time t6, the directory of the file changed from folder "key" to folder "lock."

Figure 4:
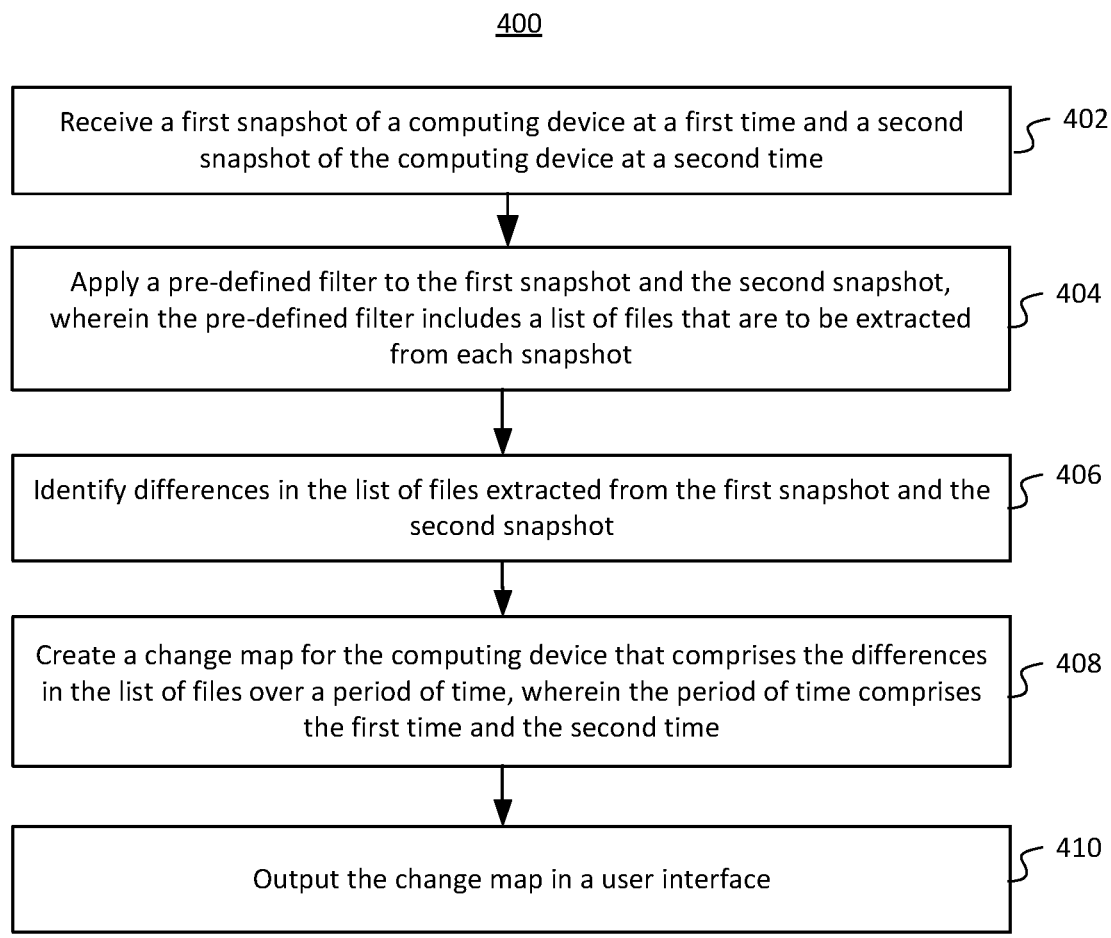
FIG. 4 illustrates a flow diagram of a method for cross-referencing forensic snapshots over time.

FIG. 4 illustrates a flow diagram of method 400 for cross-referencing forensic snapshots over time. At 402, forensics component 106 receives a first snapshot of computing device 102 at a first time and a second snapshot of computing device 102 at a second time. At 404, forensics component 106 applies a pre-defined filter (e.g., snapshot filter 108) to the first snapshot and the second snapshot, wherein the pre-defined filter includes a list of files that are to be extracted from each snapshot (e.g., for comparison purposes). Subsequent to applying the pre-defined filter, at 206, differentiator 110 identifies differences in the list of files extracted from the first snapshot and the second snapshot. At 408, change map generator 112 creates a change map for computing device 102 that comprises the differences in the list of files over a period of time, wherein the period of time comprises the first time and the second time. At 410, forensics component 106 outputs the change map (e.g., map 116) in a user interface (e.g., UI 114).

Figure 5:
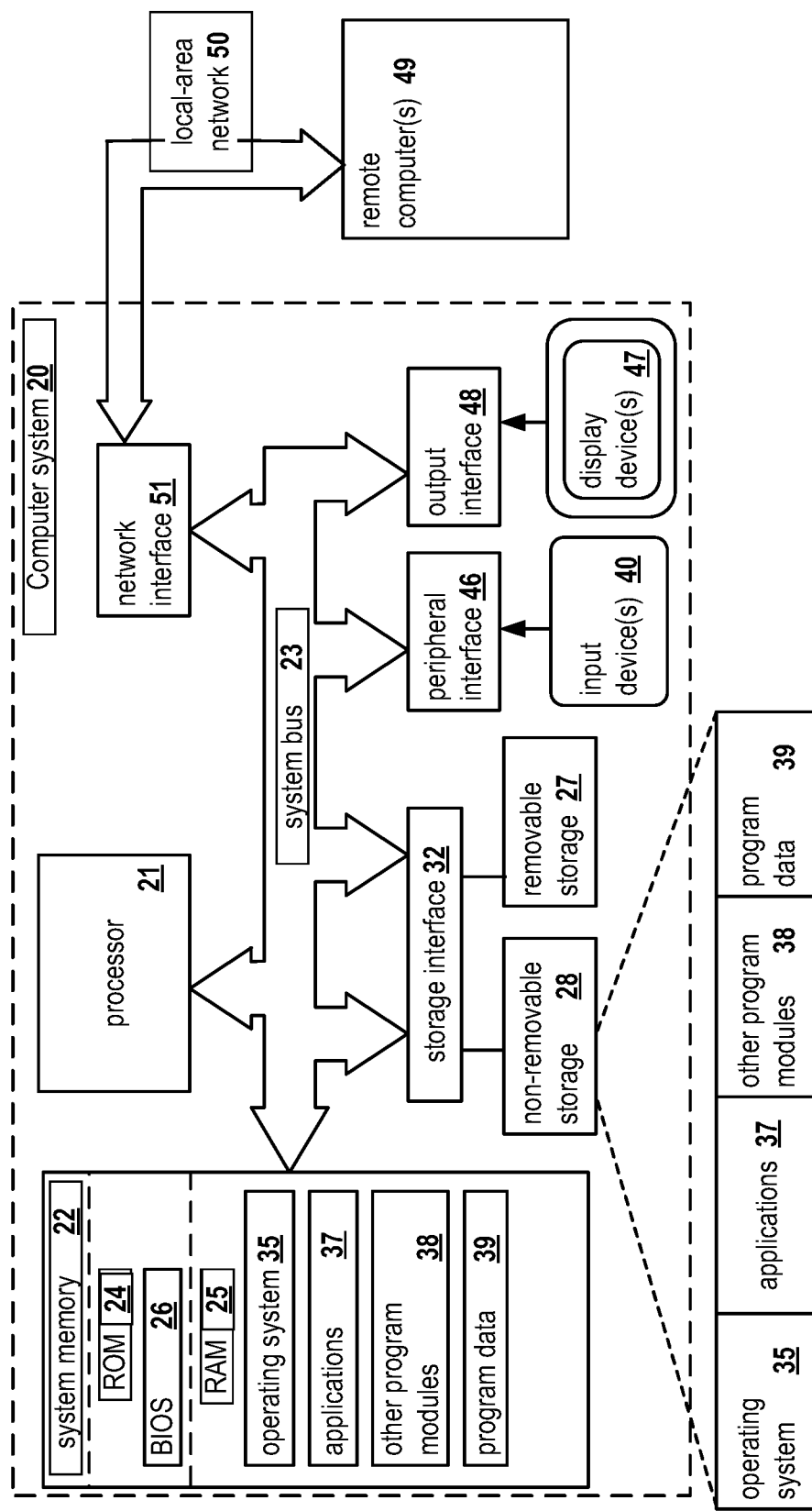
FIG. 5 presents an example of a general-purpose computer system on which aspects of the present disclosure can be implemented.

FIG. 5 is a block diagram illustrating a computer system 20 on which aspects of systems and methods for cross-referencing forensic snapshots over time may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-4 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for cross-referencing forensic snapshots over time, the method comprising:
receiving a first snapshot of a computing device at a first time and a second snapshot of the computing device at a second time;
applying a pre-defined filter to the first snapshot and the second snapshot, wherein the pre-defined filter includes a list of files that are to be extracted from each snapshot;
subsequent to applying the pre-defined filter, identifying differences in the list of files extracted from the first snapshot and the second snapshot;
creating a change map for the computing device that comprises the differences in the list of files over a period of time, wherein the period of time comprises the first time and the second time;
outputting the change map in a user interface, wherein the change map indicates changes made by the user and changes made by an unauthorized entity; and
filtering the change map to not show the changes made by the user.

2. The method of claim 1, further comprising:
receiving a third snapshot of the computing device at a third time;
applying the pre-defined filter to the third snapshot;
identifying differences in the list of files extracted from the second snapshot and the third snapshot;
modifying the change map for the computing device to further include differences in the list of files at the third time, wherein the period of time further comprises the third time.

3. The method of claim 2, wherein the differences in the list of files at the third time is relative to the second time.

4. The method of claim 2, wherein the differences in the list of files at the third time is relative to the first time.

5. The method of claim 1, wherein the change map is visually outputted in a user interface as a timeline with a plurality of selectable time points each representing a snapshot of the computing device, further comprising:
receiving a selection of a time point; and
generating a window with respective differences between a filtered snapshot associated with the time point and a prior filtered snapshot.

6. The method of claim 5, wherein the time point selected is the second time associated with the second snapshot, and wherein the window presents the differences in the list of files extracted from the first snapshot and the second snapshot.

7. The method of claim 5, wherein the window is interactive and presents drill-down analysis for each file in the respective differences.

8. The method of claim 1, wherein outputting the change map in the user interface is in response to detecting an error in the computing device.

9. The method of claim 8, wherein outputting the change map further comprises transmitting an alert to a forensic investigation entity, wherein the alert comprises access to the change map.

10. The method of claim 1, wherein filtering the change map to not show the changes made by the user comprises:
classifying each change in the change map using a machine learning algorithm trained on a dataset that indicates a plurality of changes and an identifier of an entity that executed each of the plurality of changes.

11. The method of claim 1, further comprising:
retrieving, for the first snapshot and the second snapshot, metadata that indicates states of the computing device at the first time and the second time;
determining a first performance score based on a state of the computing device at the first time and a second performance score based on a state of the computing device at the second time;
determining a change differential between the first performance score and the second performance score; and
marking a time point in the change map if the change differential is greater than a threshold change differential.

12. A system for cross-referencing forensic snapshots over time, the system comprising:
a hardware processor configured to:
receive a first snapshot of a computing device at a first time and a second snapshot of the computing device at a second time;
apply a pre-defined filter to the first snapshot and the second snapshot, wherein the pre-defined filter includes a list of files that are to be extracted from each snapshot;
subsequent to applying the pre-defined filter, identify differences in the list of files extracted from the first snapshot and the second snapshot;
create a change map for the computing device that comprises the differences in the list of files over a period of time, wherein the period of time comprises the first time and the second time;
output the change map in a user interface, wherein the change map indicates changes made by the user and changes made by an unauthorized entity; and
filter the change map to not show the changes made by the user.

13. The system of claim 12, wherein the hardware processor is further configured to:
receive a third snapshot of the computing device at a third time;
apply the pre-defined filter to the third snapshot;
identify differences in the list of files extracted from the second snapshot and the third snapshot;
modify the change map for the computing device to further include differences in the list of files at the third time, wherein the period of time further comprises the third time.

14. The system of claim 13, wherein the differences in the list of files at the third time is relative to the second time.

15. The system of claim 13, wherein the differences in the list of files at the third time is relative to the first time.

16. The system of claim 12, wherein the change map is visually outputted in a user interface as a timeline with a plurality of selectable time points each representing a snapshot of the computing device, wherein the hardware processor is further configured to:
receive a selection of a time point; and
generate a window with respective differences between a filtered snapshot associated with the time point and a prior filtered snapshot.

17. The system of claim 16, wherein the time point selected is the second time associated with the second snapshot, and wherein the window presents the differences in the list of files extracted from the first snapshot and the second snapshot.

18. The system of claim 16, wherein the window is interactive and presents drill-down analysis for each file in the respective differences.

19. A non-transitory computer readable medium storing thereon computer executable instructions for cross-referencing forensic snapshots over time, including instructions for:
- receiving a first snapshot of a computing device at a first time and a second snapshot of the computing device at a second time;
- applying a pre-defined filter to the first snapshot and the second snapshot, wherein the pre-defined filter includes a list of files that are to be extracted from each snapshot;
- subsequent to applying the pre-defined filter, identifying differences in the list of files extracted from the first snapshot and the second snapshot;
- creating a change map for the computing device that comprises the differences in the list of files over a period of time, wherein the period of time comprises the first time and the second time;
- outputting the change map in a user interface, wherein the change map indicates changes made by the user and changes made by an unauthorized entity; and
- filtering the change map to not show the changes made by the user.

\* \* \* \* \*